United States Patent [19]

Choi et al.

[11] Patent Number: 5,586,333

[45] Date of Patent: Dec. 17, 1996

[54] METHOD AND CONTROL APPARATUS FOR GENERATING POWER MANAGEMENT SIGNAL OF COMPUTER PERIPHERAL EQUIPMENT IN A COMPUTER SYSTEM

[75] Inventors: Chun-Geun Choi; Dong-Ho Kim; Jun-Hoi Kim, all of Suwon, Rep. of Korea

[73] Assignee: SamSung Electronics, Co., Ltd., Suwon, Rep. of Korea

[21] Appl. No.: 283,759

[22] Filed: Aug. 1, 1994

[30] Foreign Application Priority Data

Aug. 6, 1993 [KR] Rep. of Korea ............... 15279/1993

[51] Int. Cl.$^6$ ............................................. G06F 13/00
[52] U.S. Cl. ................................................. 395/750
[58] Field of Search ..................................... 395/750

[56] References Cited

U.S. PATENT DOCUMENTS

| | | |
|---|---|---|
| 4,259,594 | 3/1981 | Fox . |
| 4,365,290 | 12/1982 | Nelms . |
| 4,377,000 | 3/1983 | Stabb ............................ 371/11 |
| 4,747,041 | 5/1988 | Engel . |
| 5,021,983 | 6/1991 | Nguyen . |
| 5,065,357 | 11/1991 | Shiraishi . |
| 5,163,153 | 11/1992 | Cole et al. .................... 395/750 |
| 5,184,117 | 2/1993 | Gauthier . |
| 5,247,286 | 9/1993 | Ishikawa . |
| 5,287,363 | 2/1994 | Wolf et al. .................. 371/21.1 |
| 5,396,635 | 3/1995 | Fung ............................ 395/800 |
| 5,404,546 | 4/1995 | Stewart ......................... 395/750 |
| 5,428,790 | 6/1995 | Harper et al. ................. 395/750 |

Primary Examiner—Jack B. Harvey
Assistant Examiner—John Travis
Attorney, Agent, or Firm—Robert E. Bushnell, Esq.

[57] ABSTRACT

There is disclosed a power management signal generated from a computer for saving power of computer peripheral equipment by alternatively controlling a power supply or an operating state of the computer peripheral equipment, corresponding to a use state of a computer system, which the computer system has the computer peripheral equipment performing any one power management state among an on state, stand-by state, suspend state and off state. For generation of the power management signal, the power management state is checked every time a timer interrupt signal is generated, and the present power management state is maintained unchanged if the present power management state is the off state, and if the present power management state is not the off state, it is checked whether or not a count time value counted becomes a determined value after counting the count time value for counting the time lapse as much as the predetermined time unit, and then the present power management state is maintained as it is if the count time value is not the determined value, or the present power management state is changed to next power management state if the count time value becomes the determined value. Also the present power management state is determined as on state each time there is a signal inputted from an input device, and then the count time value is set according to a predetermined stand-by time value.

16 Claims, 9 Drawing Sheets

METHOD AND CONTROL APPARATUS FOR GENERATING POWER MANAGEMENT SIGNAL OF COMPUTER PERIPHERAL EQUIPMENT IN A COMPUTER SYSTEM

CROSS-REFERENCE TO RELATED APPLICATIONS

This application makes reference to, incorporates the same herein, and claims all benefits incurring under 35 U.S.C. §119 from an application for "Method And Control Apparatus For Generating Power Management Signal Of Computer Peripheral Equipment In A Computer System" filed in the Korea Industrial Property Office on 6 Aug. 1993 and assigned Ser. No. 1993/15279.

BACKGROUND OF THE INVENTION

The present invention relates to a computer system, and more particularly, to a method and a control apparatus for generating a power management signal for saving power of computer peripheral equipment, by selectively controlling a power supply or an operation state of the computer peripheral equipment, corresponding to a use state of the computer system.

Generally, computer peripheral equipment is each input/output apparatus, such as a monitor, a printer, a CD-ROM (Compact Disk-Read Only Memory), a plotter, etc., connected to a computer. Conventionally, such computer peripheral equipments can not be used as soon as the power supply is started. That is, when the power supply is started, it needs the time to perform operations such as an initiated operation and a preparatory heat operation or warm-up operation, though there is some difference according to each kind of equipment peculiarity. Accordingly, in case that a power is again supplied for re-using the relevant peripheral equipment of the computer, after cutting off the power in the midst of use of computer peripheral equipment, it is inconvenient to wait for the time it takes for the equipment to re-initialize or warm up again. The power supply state is maintained without a power interception in a state of use of the computer system even though the user does not use certain equipment, among the computer peripheral equipments, for a while. Especially with regard to the monitor being widely used as a computer display apparatus, the power is, always and mostly, supplied while the computer is being used. Therefore, unnecessary electric power has been wasted by the supply of the power to the monitor or other computer peripheral equipment even during non-use of the computer and especially a waste of power to the monitor greater than that to other peripheral equipments since the monitor drives a CRT (Cathode-Ray Tube) as a display device by using a high voltage.

Therefore, in the midst of computer system operation, in case that the computer system is not used by the user for a long time, the computer system senses it, and the power has been saved by cutting-off the power supply of the computer peripheral equipment or by controlling an operation state.

It is well known in the art to blank a data image being displayed on a monitor if no key input by the user has been sensed for a given time in the computer system, as, for example, disclosed in U.S. Pat. No. 5,059,961 for a "Screen Blanker For A Monitor Of A Computer System" by Te J. Cheng, et al., wherein the computer blanks the data image being displayed on the monitor if there is no input for a predetermined non-use time. After this time, the computer performs a blanking function by cutting off supply of a horizontal synchronizing signal and a vertical synchronizing signal to the monitor. When a key input is again generated by the user during the blanking function operation, the computer releases the blanking function of the monitor and again displays the data image displayed previously.

In U.S. Pat. No. 5,059,961, the life of the monitor may be lengthened by blanking a screen under a non-use state of the computer but the monitor still receives the power during the blanking period of the screen by blanking only the data image being displayed on the monitor. Accordingly, a waste of power is nearly similar to the waste of power during normal operation and a saving of power by such blanking function is tiny, and further even such tiny power saving is not applicable to other computer peripheral equipment.

Additionally, not only is there an inconvenience of installing software or special hardware inside of the computer for performing the screen blanking function, but there is also a problem of increased cost of the computer system. There is also a problem when utilizing the additional special hardware that the user can not voluntarily change the non-use time since the non-use time for performing the screen blanking function is predetermined and fixed, in accordance with embodying a sensing of use or non-use of the computer system, by the hardware.

The United States VESA (Video Electronics Standards Association) proposes a method for saving the power by managing the power of the monitor as one type of computer peripheral equipment corresponding to a use state of the computer system, in a "DPMS (Display Power Management Signaling) PROPOSAL" published and distributed by VESA on 26 Jan. 1993. If according to the "DPMS PROPOSAL", the computer as a host system selectively supplies or cuts off the horizontal synchronizing signal and/or the vertical synchronizing signal to the monitor for realizing mutually different power management states corresponding to a use state of the computer system, and the monitor performs the power management state corresponding to the input state of the horizontal synchronizing signal and the vertical synchronizing signal from the computer. The power management state is divided into an on state, a stand-by state, a suspend state and an off state, resulting in each of the horizontal synchronizing signal and the vertical synchronizing signal having a pulse or no pulse according to each power management state as shown in Table 1 below. That is, according to the power management state, all pulses of the horizontal synchronizing signal and the vertical synchronizing signal are output for the on state, only the pulse of the vertical synchronizing signal is output for the stand-by state, only the pulse of the horizontal synchronizing signal is output for the suspend state, and no pulses of the horizontal synchronizing signal and the vertical synchronizing signal are output for the off state. The power management state sequentially converts in the order of on state, stand-by state, suspend state and off state in response to a continuous time lapse of non-use of the computer system.

TABLE 1

| Power Management State | Horizontal Synchronizing Signal | Vertical Synchronizing Signal |
| --- | --- | --- |
| On State | Pulse | Pulse |
| Stand-by State | No Pulse | Pulse |
| Suspend State | Pulse | No Pulse |
| Off State | No Pulse | No Pulse |

A "no pulse" state of each signal in above Table 1 means a state under 10 HZ of frequency of each signal and a "pulse" state of each signal means a state of normal synchronizing signal frequency of each signal.

SUMMARY OF THE INVENTION

It is therefore, one object of the present invention to provide a method for generating a power management signal for selectively controlling a power supply or an operating state of computer peripheral equipment corresponding to a use state of a computer system.

It is another object of the present invention to provide a method for generating the power management signal for selectively controlling a power supply or an operating state of computer peripheral equipment corresponding to a use state of a computer system, even without alteration of the computer hardware or installation of additional computer hardware.

It is yet another object of the present invention to provide a method for generating a power management signal for selectively controlling a power supply or an operating state of computer peripheral equipment corresponding to a use state of a computer system, wherein a user may establish a power management function for generating the power management signal in a computer, or may release the established power management function.

It is still another object of the present invention to provide a method for generating a power management signal in which a user may set the non-use time for each power management state for generating the power management signal for selectively controlling a power supply or an operating state of computer peripheral equipment corresponding to a use state of a computer system.

It is still yet another object of the present invention to provide an apparatus for controlling generation of a power management signal, wherein the power management signal selectively controls a power supply or an operating state of computer peripheral equipment corresponding to a use state of a computer system.

In accordance with one aspect of the present invention, a method for attaining these and other objects may be achieved by having: a step of checking a present power management state every given time period; a step of maintaining a present power management state as it is if a present power management state is an off state; a step of determining a time lapse of a predetermined unit of time by counting a count time value; a step of checking whether a counted count time value is equal to a preset value after counting the count time value if a present power management state is not off state; a step of maintaining a present power management state as it is if a count time value is not a preset value; a step of changing a present power management state to next power management state if a count time value is a preset value; a step of determining a present power management state as on state whenever there is a signal input from an input device; and a step of determining a count time value as a predetermined stand-by time value.

Further, a method of the present invention for achieving the above mentioned objects may be accomplished by having: a step of checking the existence of an option in response to an input by a key executing a power management; steps of determining a stand-by time value, a suspend time value and a power off time value as each predetermined default value if there is no option, of determining a power management state as on state, of determining a count time value as a stand-by time value, and of stationing a power management function in a memory; and steps of determining time value with option as selected time value if there is, at least, any one option out of a stand-by time, a suspend time and a power off time, of determining time value without option as each predetermined default value, of determining a power management state as on state and a count time value as a stand-by time value, and then of stationing a power management function in a memory.

An apparatus of the present invention for attaining the above-mentioned objects includes: a timer for generating a timer interrupt signal every given time period; a display controller for generating a horizontal synchronizing signal and a vertical synchronizing signal; an input device; a time count device for checking a present power management state whenever a timer interrupt signal is generated, of maintaining a present power management state as it is if the present power management state is off state, and of checking whether or not a count time value counted is a preset value after counting a count time value for counting a time lapse as much as a predetermined unit if a present power management state is not off state; a changing device for maintaining a present power management state as it is if a count time value is not a preset value, as a result of checking of a time count step, and of generating first and second power management data as logic state for changing a power management state to a next power management state if a count time value is a preset value; an input device monitoring device for generating first and second power management data as logic state for determining a present power management state as on state whenever there is a signal input from an input device, and of determining a count time value as a predetermined stand-by time value; a latch device for latching first and second power management data; a first supply control device for selectively supplying a horizontal synchronizing signal output from a display control device, to a computer peripheral equipment, in accordance with a logic state of first power management data latched and output from a latch device; and a second supply control device for selectively supplying a vertical synchronizing signal output from a display control device, to a computer peripheral equipment, according to a logic state of second power management data latched and output from a latch device.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

Figure 1:
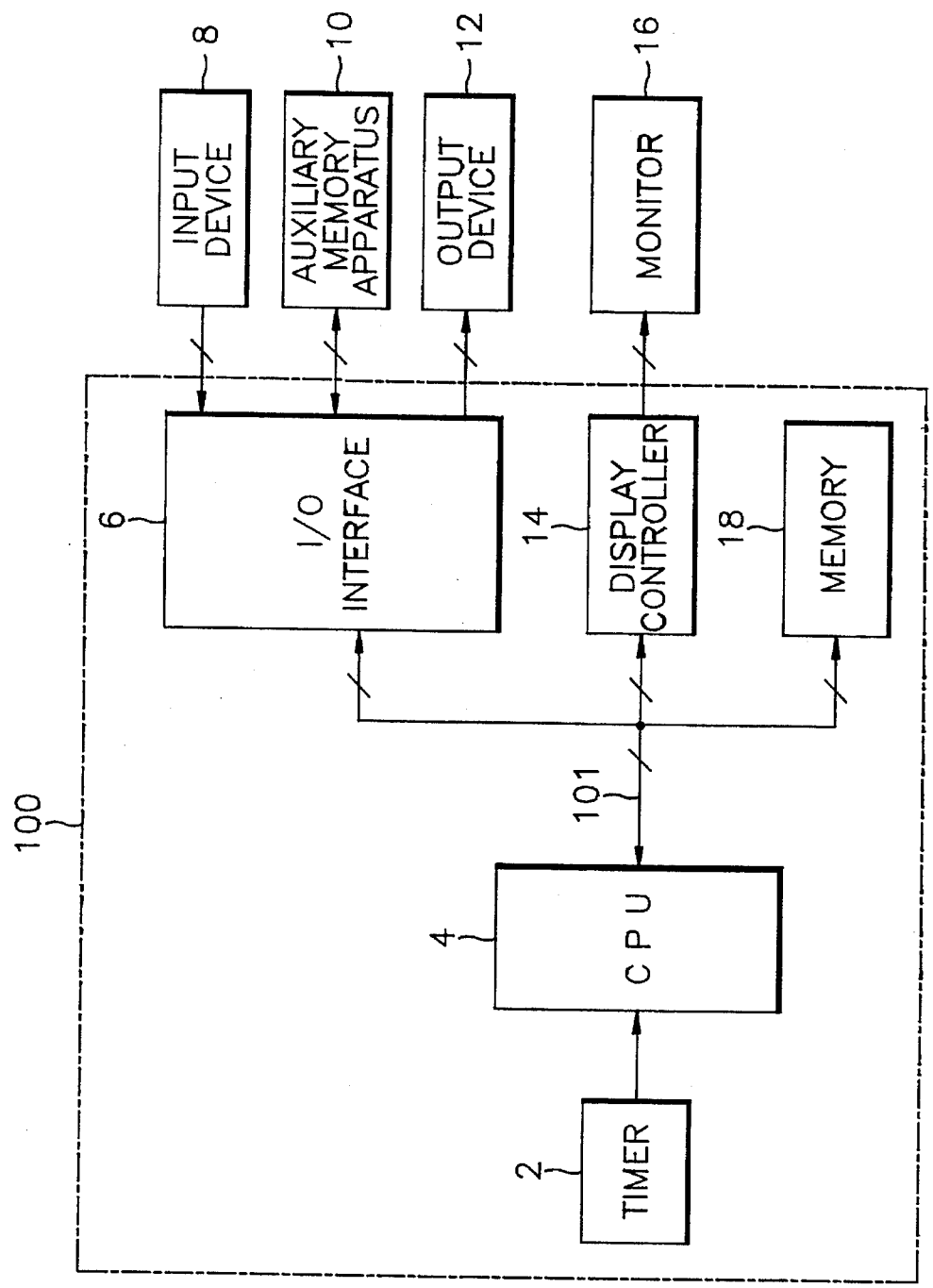
FIG. 1 is a summary block diagram of a general computer system applicable to the present invention.

In the following description, note that the same configuration elements in diagrams appear as the same characters in as many places as possible. Further, in the following description, numerous specific details such as concrete circuit configuration, parts and operation time are set forth to provide a more thorough understanding of the present invention. It will be apparent, however, to one skilled in the art, that the present invention may be practiced without these specific details. In other instances well known circuits have not been described so as not to obscure the present invention.

A Korean patent application number 1993-5327 by the applicant of the present invention for a "Power Saving Apparatus And Control Method Of A Monitor" filed in the Korea Industrial Property Office on 31 Mar. 1993 describes, that the monitor perceives the existence of use of the computer system by sensing a receiving existence of an input signal from an input device of the computer, with a connection device connected to the input device of the computer. At this time, if there is no input signal for over a given time, the monitor cuts off an operating power and implements a power saving mode, and if the input signal is received in the midst of implementation of the power saving mode, the power is re-supplied, and therefore the power is saved. However, there are still problems that special hardware as a connection device should additionally be installed inside or on the outside of the computer or the monitor, and that a life of the monitor is shortened by a frequent on/off switching operation of the power whenever the user repeats use/non-use of the computer system, since the operating power of the monitor is merely cut off or the power is merely resupplied, corresponding to use or non-use of the computer system.

Korean patent application number 1993-5332 for a "Power Saving Apparatus Of A Computer Peripheral Equipment", filed in the Korea Industrial Property Office on 31 Mar. 1993 by the applicant of the present invention, applies the power management signal proposed by the VESA in the "DPMS PROPOSAL" for saving power of the computer peripheral equipment. The computer peripheral equipment detects a control mode from an operation control signal generated from the outside generating device corresponding to a use status of the computer system, and controls the power supply or an operating state corresponding to the detected control mode in order to save the power. The operation control signal as the power management signal decides each control mode for controlling the power supply or the operating state of the computer peripheral equipment corresponding to a use status of the computer system. The control mode is divided into a normal operation mode corresponding to an on state, a stand-by mode corresponding to a stand-by state, a suspend mode corresponding to a suspend state and a power off mode corresponding to an off state, in comparison with the power management state proposed in the "DPMS PROPOSAL" of VESA mentioned above. Such stand-by mode, suspend mode and power off mode, except the normal operation mode, are power saving modes for saving the power. Accordingly, the control mode may be largely divided into the normal operation mode and the power saving mode, and any mode among the power saving modes may be omitted if necessary.

For convenience of the description, the present invention is described as follows, for instance, with reference to a monitor as an example of the applied computer peripheral equipment out of the available computer peripheral equipment.

In a summary block diagram of a computer system applicable to the present invention, FIG. 1 shows configuration of a general computer system by connecting a computer 100 with an input device 8, an auxiliary memory apparatus 10, an output device 12 and a monitor 16, wherein the computer 100 includes a timer 2, a CPU (Central Processing Unit) 4, an I/O (Input/Output) interface 6, a display controller 14 and a memory 18.

In FIG. 1, the CPU 4 is connected to the I/O interface 6, the display controller 14 and the memory 18 through system bus 101 which has an address bus, a data bus and a control bus. The timer 2 generates a timer interrupt signal every given time period and then supplies it to the CPU 4. The CPU 4 performs a determined program and controls a computer system wholly. The I/O interface 6 interfaces signals input and output among the CPU 4, the input device 8, the auxiliary memory apparatus 10 and the output device 12. The input device 8 includes a keyboard and a mouse for inputting each kind of information or instruction to the CPU 4. The auxiliary memory apparatus 10 has a hard disk drive and a floppy disk drive, and the output device 12 contains a printer and a plotter for outputting information processed by the CPU 4. The display controller 14 displays information processed by the CPU 4 on the monitor 16 and is controlled by the CPU 4, and an MDA (Monochrome Display Adapter), a CGA (Color Graphics Adapter), an EGA (Enhanced Graphics Adapter) and a VGA (Video Graphics Adapter) may each be used as a display controller and are widely used according to the kinds of computer 100 or monitor 16 being used. The memory 18 stores an operating program of the CPU 4 and temporarily stores processing data of the CPU 4, and comprises a ROM (Read Only Memory) and/or a RAM (Random Access Memory).

Figure 2:
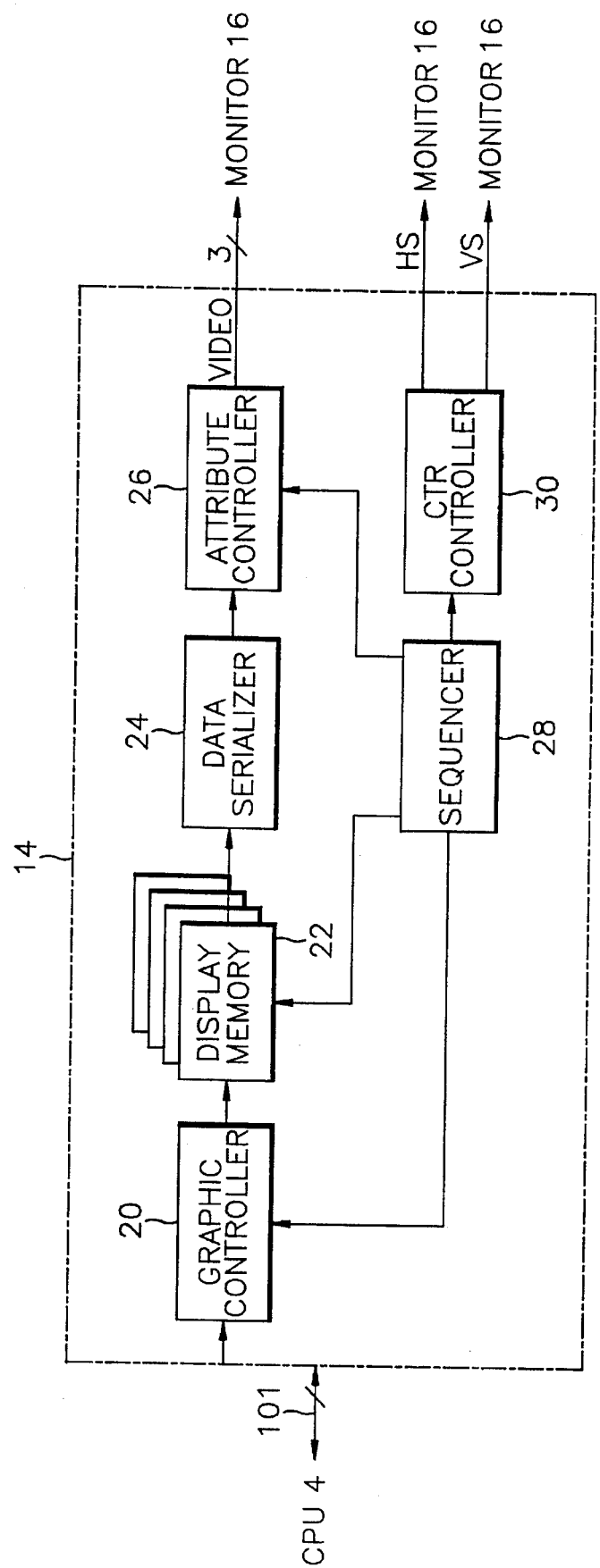
FIG. 2 is a block diagram of one embodiment for a display controller of FIG. 1.

FIG. 2 is a detailed block diagram of one instance of using the VGA as the display controller 14 of FIG. 1, and shows configuration in case of use of a general VGA by including a graphic controller 20, a display memory 22, a data serializer 24, an attribute controller 26, a sequencer 28 and a CRT controller 30.

The display controller 14 in FIG. 2 is described in detail at pages 33 and 137 of "Programmer's Guide to the EGANGA" by collaboration of George Sutty and Steve Blair, and published and distributed by Brady Books of the United States in 1988 and incorporated herein by reference.

The followings are a summary configuration and an operation of the display controller 14, useful to understand the present invention, referring to FIG. 2.

The graphic controller 20, the attribute controller 26, the sequencer 28 and the CRT controller 30 are connected to the CPU 4 through system bus 101 and are controlled by the CPU 4. The attribute controller 26 and the CRT controller 30 are connected to the monitor 16.

The graphic controller 20 is connected between the CPU 4 and the display memory 22, and may be programmed so that it may process a logical function between information to be stored and information already stored in the display memory 22. The logical function has a logical product, a logical sum, an exclusive-OR and a spin, and in case of using such logical function, work for drawing a picture on screen may be simplified.

The display memory 22 stores information for a screen through the graphic controller 20, and has a capacity of 256K bytes, and consists of four independent color faces each having the capacity of 64K bytes.

The data serializer 24 receives each byte of information output from the display memory 22 and converts the information into a sequential bit stream for sending it to the monitor 16.

The attribute controller 26 has a color look-up table, converts color information output from the display memory 22 into displayable color information for sending it to the monitor 16 according to the color look-up table, and transmits a video signal VIDEO according to the converted color information to the monitor 16. The video signal VIDEO contains three primary colors of R (red), G (green) and B (blue). Colors to use among colors supported by the display controller 14 may be indicated by the color look-up table of the attribute controller 26 modified by the CPU 4.

The sequencer 28 is controlled by the CPU 4 and controls timing for all functions of the display controller 14.

Figure 8:
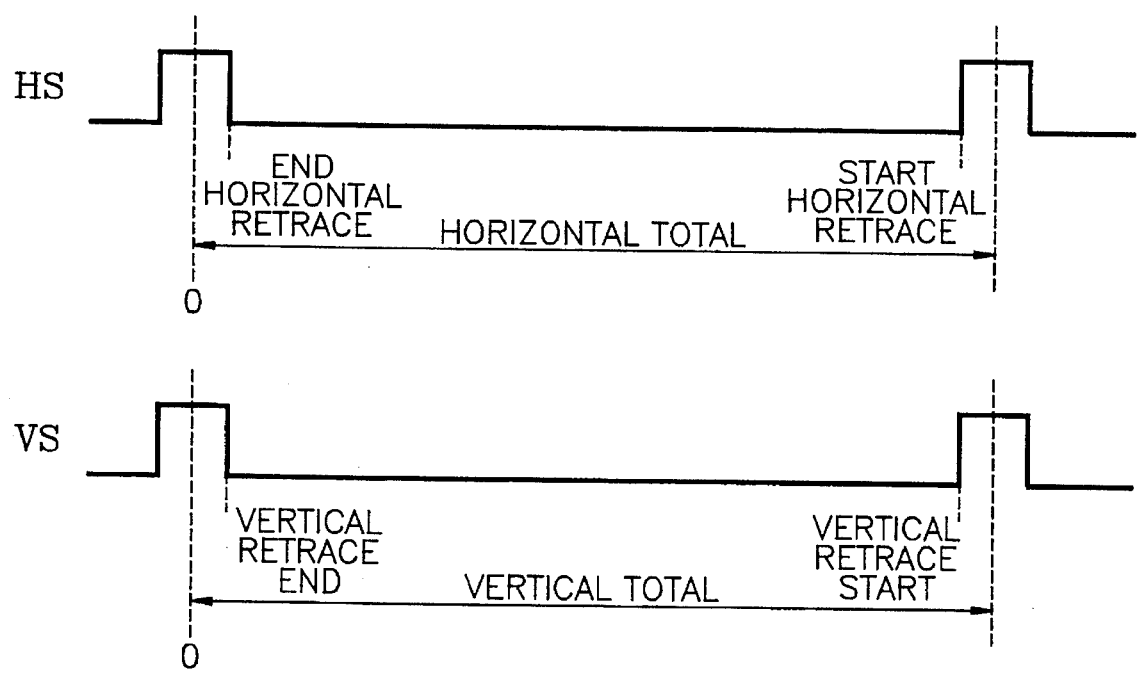
FIG. 8 is a timing diagram of an output signal in a CRT controller of FIG. 2.

The CRT controller 30 generates signals relevant to display timing of the monitor 16, namely as a synchronizing signal and a blanking signal, and controls a display and a re-image display operation by transmitting the signals to the monitor 16. The synchronizing signal is made up of a horizontal synchronizing signal HS and a vertical synchronizing signal VS. The blanking signal is not shown in FIG. 2 since there is no connection with actual contents of the present invention. Timing of the horizontal synchronizing signal HS and the vertical synchronizing signal VS output from the CRT controller 30 is as shown in FIG. 8.

Referring to pages 78–87 of the "Programmer's Guide to the EGA/VGA", the CRT controller 30 includes many CRT timing register, vertical counters and a horizontal counter for controlling the display and the re-image display operation. A CRT timing register is initiated by BIOS (Basic Input Output System) and may be changed, in case of all standard modes.

A horizontal total register, a start horizontal retrace register and an end horizontal retrace register among CRT timing register are related to timing of the horizontal synchronizing signal HS. The horizontal total register is 8 bit value and indicates number of character clock appeared on one line of horizontal scanning of a screen. The start horizontal retrace register is 8 bit value and indicates a time point of starting of a horizontal retracing on the scanning. The end horizontal retrace register is lower 5 bit value among the 8 bit values and indicates the time point of ending of horizontal retracing.

In describing generation of the horizontal synchronizing signal HS as following, a value of the horizontal counter is increased once for each character clock, and the horizontal retrace is finished when the horizontal counter value becomes the same value as the lower 5 bit value of the end horizontal retrace register by the continuous increasing from an initial value, and the horizontal retrace is started when the horizontal counter value becomes the same value as the value of the start horizontal retrace register, and the horizontal counter is initiated as 0 when the horizontal counter value is the same value as the value of the horizontal total register. Therefor, a frequency of the horizontal synchronizing signal HS is decided by a value of the horizontal total register and a horizontal retrace period is decided by values of the start horizontal retrace register and the end horizontal retrace register. Accordingly, the horizontal synchronizing signal HS is normally generated when the start horizontal retrace value is smaller than the horizontal total value.

Referring to timing of the vertical synchronizing signal VS, there are a vertical total register, a vertical retrace start register and a vertical retrace end register among CRT timing register. The vertical total register is 9 bit value and indicates the number of the horizontal retraces appearing in one vertical scanning period.

The vertical retrace start register has a 9 bit value and indicates the time point of staging of the vertical retrace. The vertical retrace end register is the lower 4 bit value among 8 bit values and indicates the time point of ending of the vertical retrace.

Generation of the vertical synchronizing signal VS is described as follows, a vertical counter value is increased once for each horizontal retrace, and a vertical retrace is finished when the vertical counter value becomes the same value as the lower 4 bit value of the vertical retrace end register by continuously increasing from an initial value, and the vertical retrace is started when the vertical counter value becomes the same value as value of the vertical retrace start register, and the vertical counter is initiated as 0 when the vertical counter value becomes the same value as the value of the vertical total register. Therefore, a frequency of the vertical synchronizing signal VS is decided by value of the vertical total register and a vertical retrace period is decided by values of the vertical retrace start register and the vertical retrace end register. Accordingly, the vertical synchronizing signal VS is normally generated when the vertical retrace start value is smaller than the vertical total value.

Figure 3:
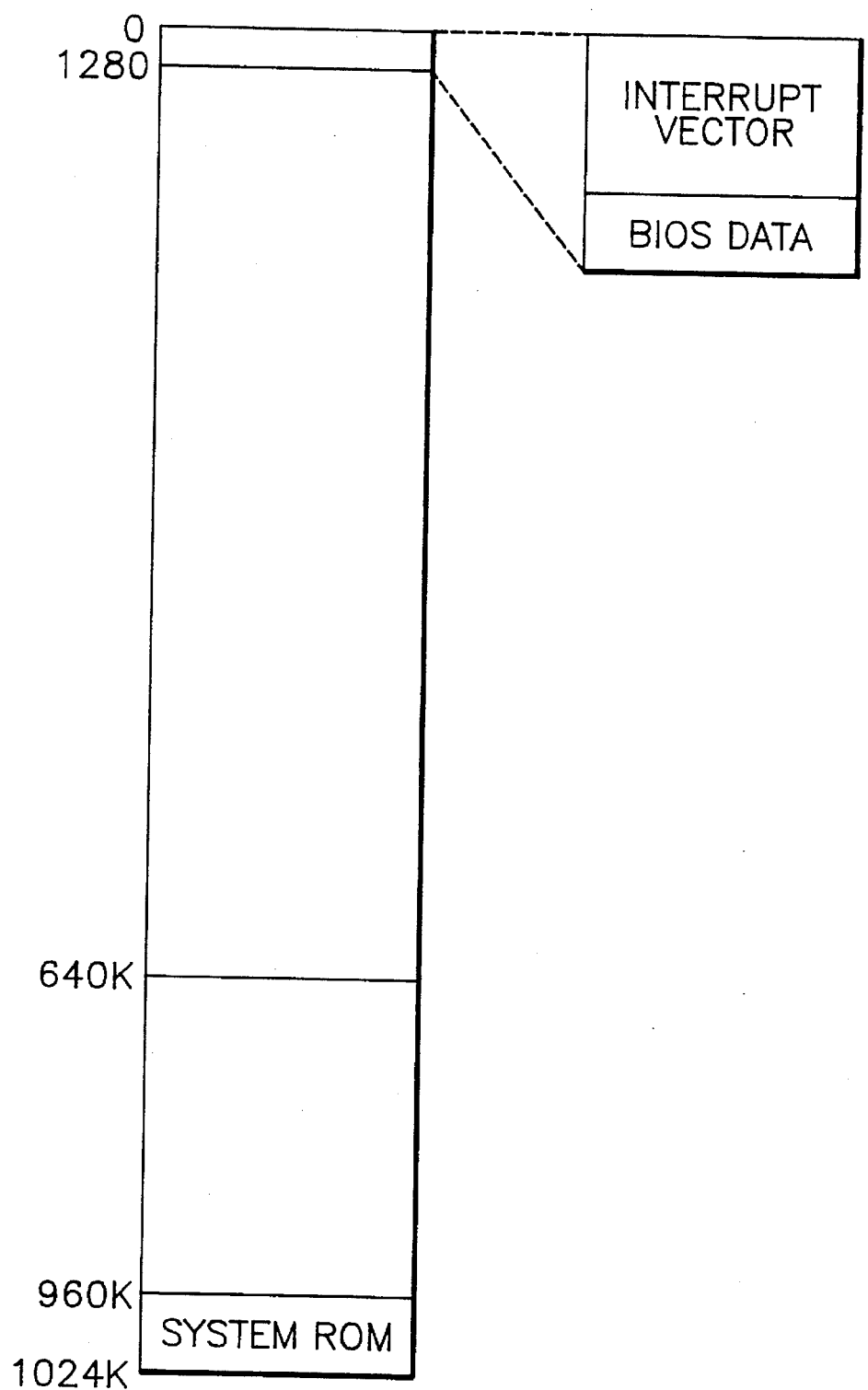
FIG. 3 is a memory map structure diagram of FIG. 1.

Meanwhile, a memory map of the memory 18 in FIG. 1 is different according to either the kind of computer or kind of operating system. Instances of XT and AT for an IBM PC are shown in FIG. 3. Referring to FIG. 3, several kinds of interrupt vectors and BIOS data are stored in an area from 0 to 1280 bytes, i.e. the lowest address of the memory 18 having the area of 1024K bytes (1M bytes). The area from 1280 bytes to 640K bytes is for the DOS (Disk Operating System) area and in this area each file of DOS, user's program and data are stored. In the area from 640K bytes to 960K bytes, data for screen output and hard disk BIOS data are stored. The area from 960K bytes to 1024K bytes is a system ROM area and in this area ROM BIOS, ROM basic and user's ROM are stored.

In order to generate the power management signal in a computer system as previously mentioned, the power management function of the present invention is installed in the computer 100 according to performing a set-up procedure of the present invention. The power management function refers to a function for generating the power management signal for controlling selectively the power supply or the operation state of the computer peripheral equipment corresponding to a use state of the computer system. The power management function of the present invention is divided into a time monitoring procedure as shown in FIG. 5 and an input device monitoring procedure as shown in FIG. 6.

Figure 4A:
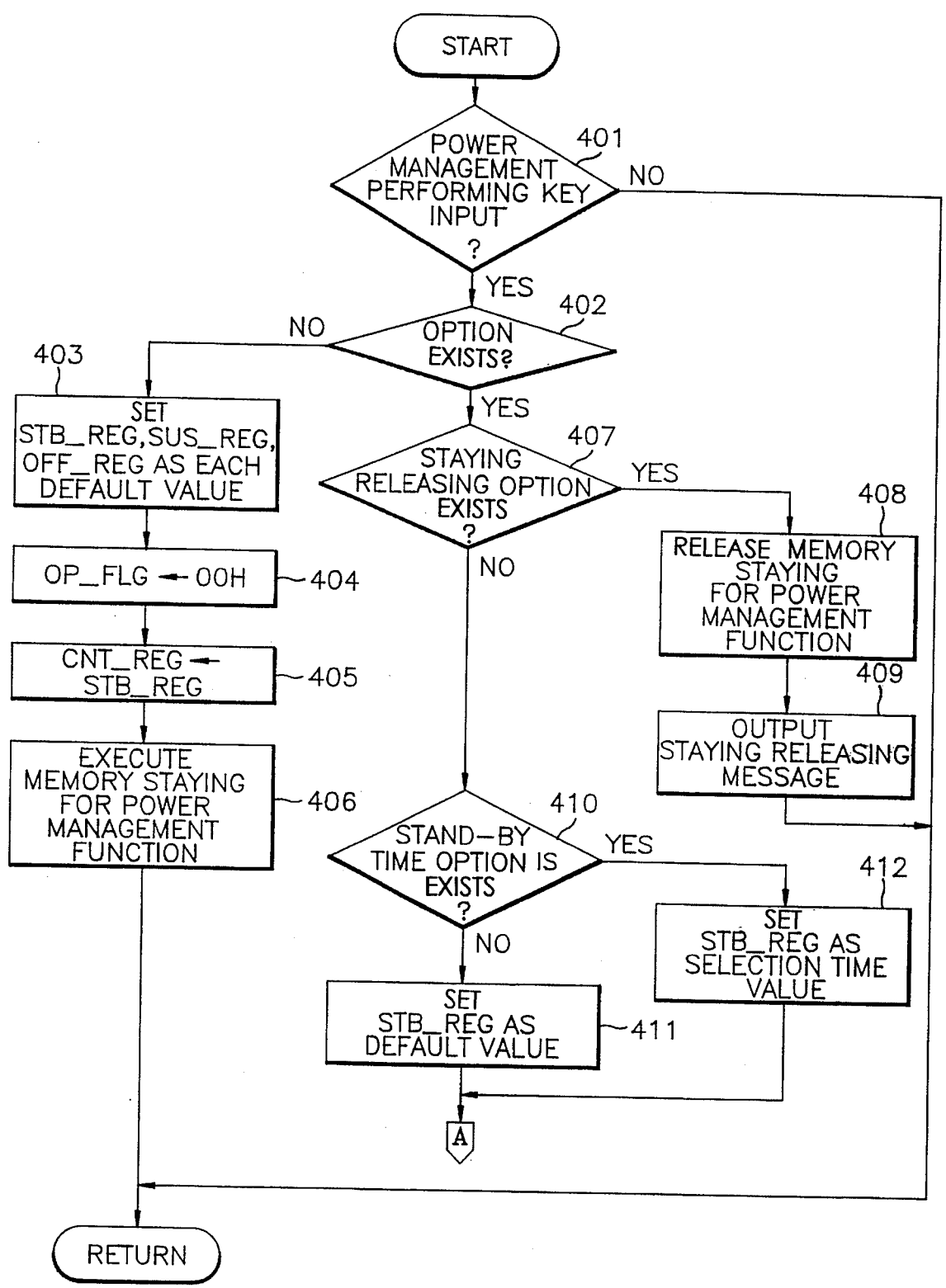
FIGS. 4A–4B are processing flow charts of a set-up procedure according to the present invention.
Figure 4B:
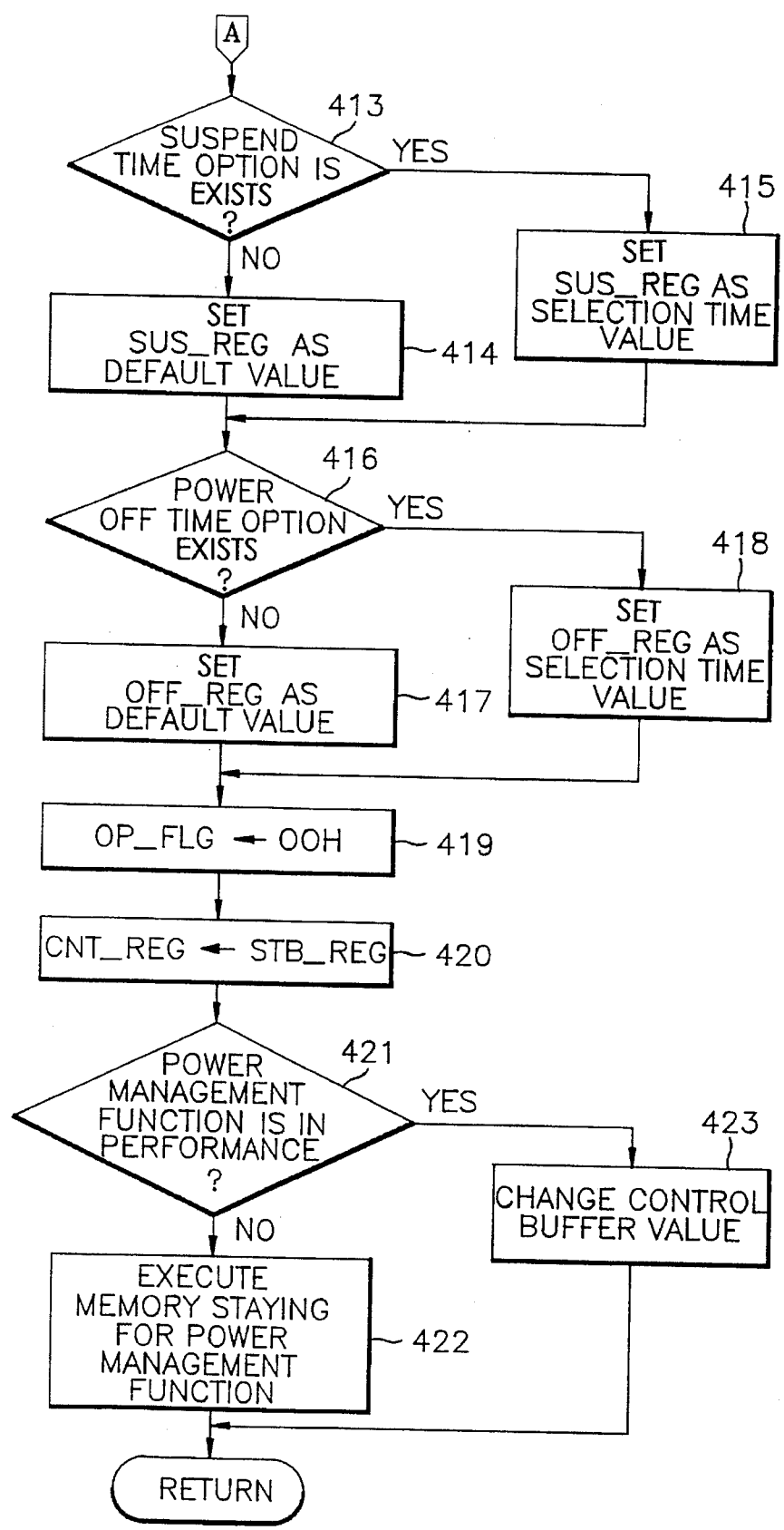
Figure 5:
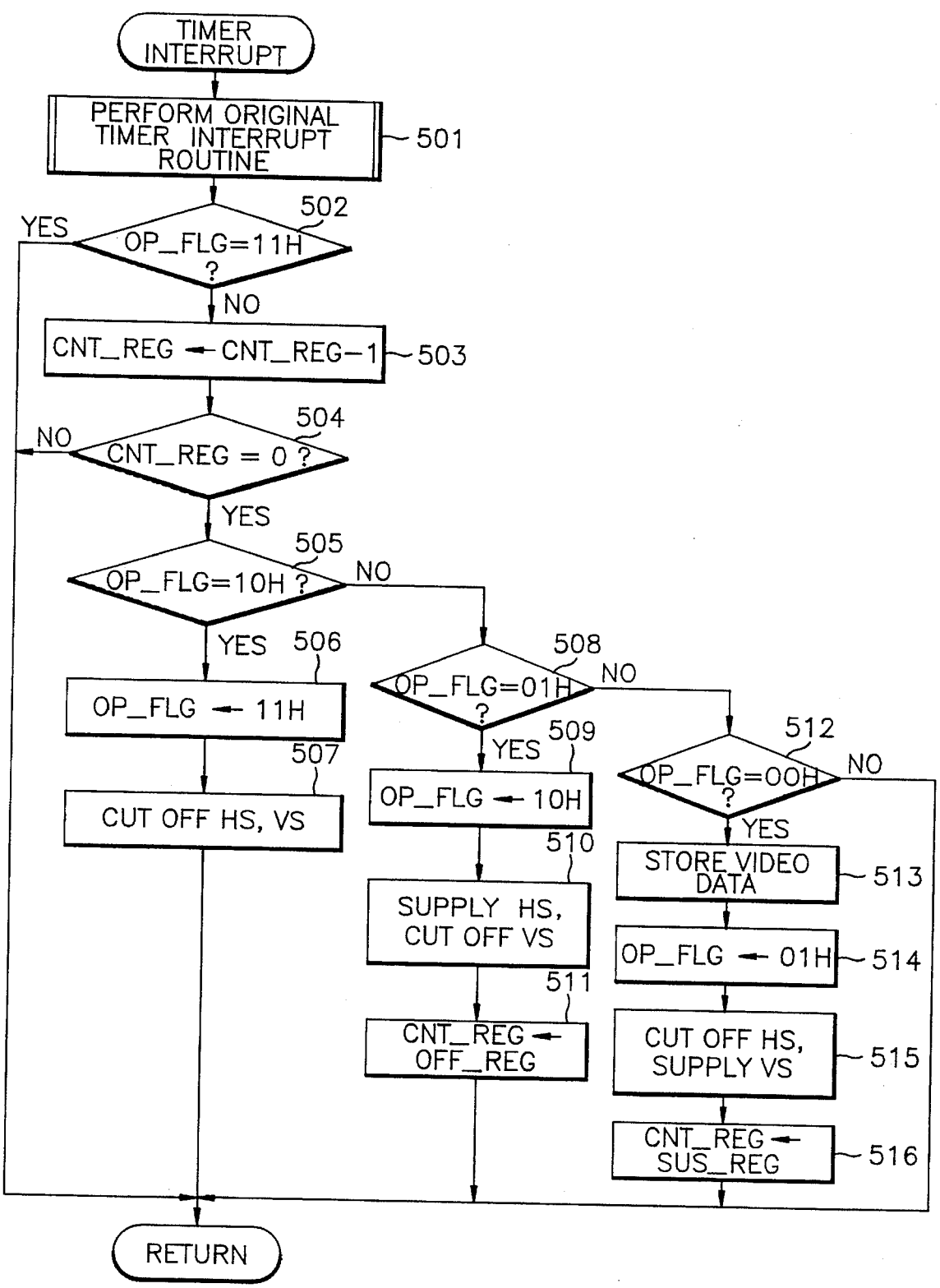
FIG. 5 is a processing flow chart of a time monitoring procedure according to the present invention.
Figure 6:
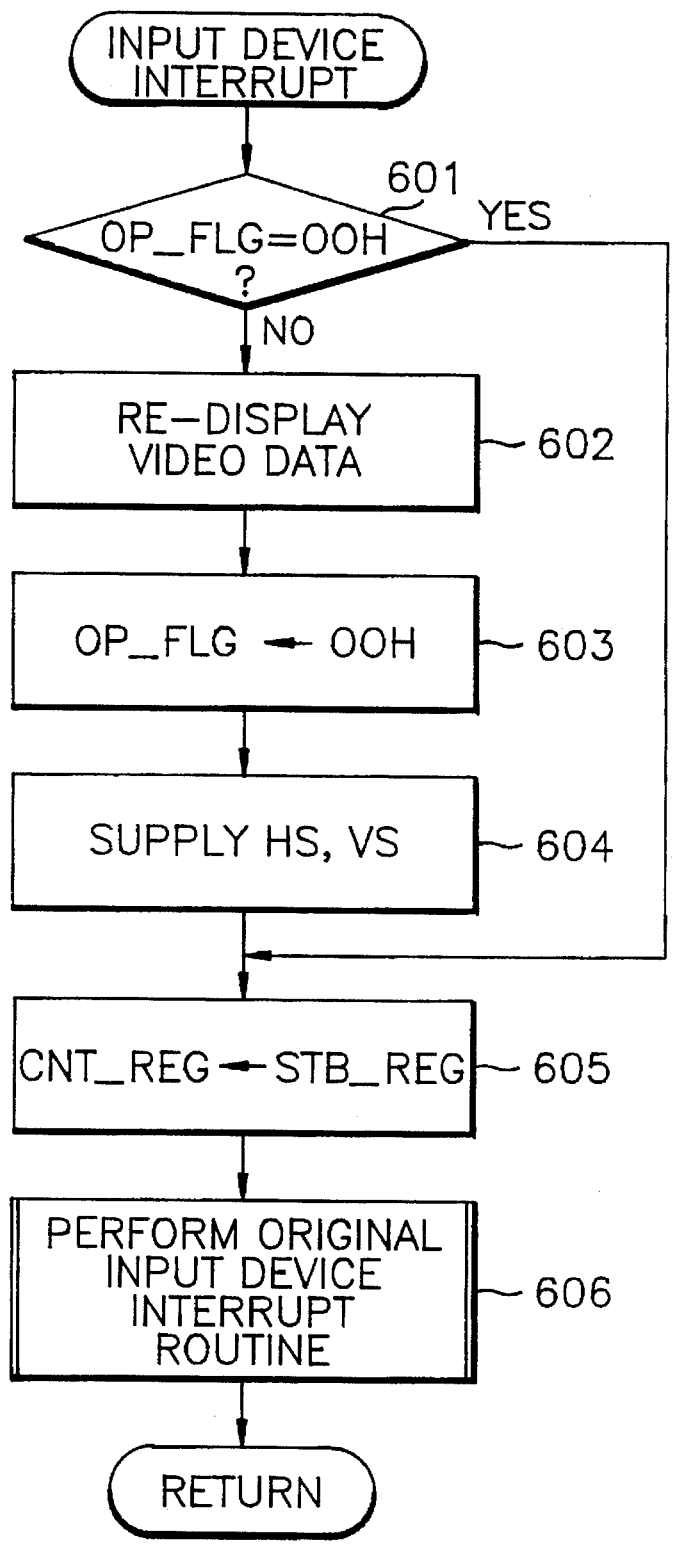
FIG. 6 is a processing flow chart of an input device monitoring procedure according to the present invention.

FIGS. 4A–4B show procedures for installing the power management function of the present invention by altering an interrupt vector, by storing several kinds of control buffer values for implementation of the present invention, and by continuously performing the time monitoring procedure of FIG. 5 and the input device monitoring procedure of FIG. 6 in RAM of the memory 18. Step 401 of FIG. 4A, checks for an input from a power management performing key, and if the power management performing key is input, loads a program consisting of the set-up procedure, the time monitoring procedure and the input device monitoring procedure, and performs step 402, and returns to step 401 if the power management performing key is not input. Step 402 checks for an option existence for the power management performing key, and performs step 407 if there is an option, but executes step 403 if there is no the option. Step 403 sets each default value of a stand-by time buffer STB_REG, a suspend time buffer SUS_REG and a power off time buffer OFF_REG. Step 404 sets a status flag OP_FLG as 00H. Step 405 sets a count buffer CNT_REG value corresponding to the time value of the stand-by time buffer STB_REG. Step 406 implements a "memory staying" operation for the power management function, "memory staying" being defined as storing and maintaining the program, i.e. the power management function, in memory as long as the computer system is on, wherein the power management function may be used even when other programs are active in the computer system, i.e. the power management function becomes memory-resident, and then returns to step 401. Step 407 checks for an existence of a "staying releasing option", defined below, then performs step 408 if there is a staying releasing option, or performs step 410 if there is no staying releasing option. The staying releasing option of step 408 releases the memory staying for the power management function so that the power management function is no longer memory-resident as described below, and step 409 outputs a staying releasing message to the monitor 16 and then returns to step 401. Step 410 checks for an existence of a "stand-by time option", described below, and sets the stand-by time buffer STB_REG as the default value in step 411 if there is no stand-by time option, or sets the stand-by time buffer STB_REG according to a selection time value selected by the user in step 412 if there is a stand-by time option then performs step 413 in FIG. 4B. Step 413 checks for an existence of a "suspend time option", defined below, and sets the suspend time buffer SUS_REG as the default value in step 414 if there is no suspend time option, and sets the suspend time buffer SUS_REG as a selection time value selected by the user in step 415 if there is a suspend time option, then executes step 416. Step 416 checks for the existence of a "power off time option", defined below, and sets the power off time buffer OFF_REG as the default value in step 417 if there is no power off time option, and sets the power off time buffer OFF_REG as a selection time value selected by the user in step 418 if there is a power off time option then executes step 419. Step 419 sets the status flag OP_FLG as 00H. Step 420 sets the count buffer CNT_REG value corresponding to the time value of the stand-by time buffer STB_REG. Step 421 checks for an implementation of the power management function and executes the memory staying for the power management function in step 422 if the power management function is not being performed, or alters only control buffer values in step 423 if the power management function is being performed and then returns to step 401.

The power management performing key signifies the key of a keyboard of the input device 8 used by user in order to perform the set-up procedure of FIGS. 4A–4B, under condition of storing the procedures from FIGS. 4A to FIG. 6 on floppy disk or hard disk of the auxiliary memory apparatus 10. If necessary, each kind of option may be determined when the power management performing key is input.

Regarding the above mentioned options, these options are a staying releasing option, a stand-by time option, a suspend time option and a power off time option. The staying releasing option is defined as removing the time monitoring procedure of FIG. 5 and the input device monitoring procedure of FIG. 6 stayed, i.e. stored or resident, in the memory 18, by performing of the set-up procedure of FIGS. 4A–4B, and to restore originally the interrupt vector altered in installing the power management function, and to remove each control buffer value. The stand-by time option is that the user selects and determines the time from the beginning of detected non-use of the input device 8 to a time for implementation a stand-by state in the midst of using of the computer 100. The suspend time option signifies that the user selects and determines the time from the start of the stand-by state to a time for implementation a suspend state. The power off time option means that the user selects and determines the time from the start of the suspend state to a time for executing an off state.

Assuming that a power management performing key input causes the power management function to be installed by inputting a character "PSAVE" at the command prompt, and that each option is input in response to a character, i.e. switch, following PSAVE, for instance, they are distinguished by the staying releasing option "/U" switch, the stand-by time option "/T" switch, the suspend time option "/P" switch and the power off time option "/O" switch. The stand-by time option, the suspend time option and the power off time option may input all together or may be selectively input. When the stand-by time option, the suspend time option and the power off time option are used, a relevant time value is input next to each corresponding switch. If the input time value for any option as 0, the power management state related to that option is not actually executed, as mentioning later. The staying releasing option may be input, following activation of the power management performing key at the command prompt, when it is desired to remove the power management function from the memory.

The stand-by time buffer STB_REG is a buffer for storing a stand-by time, the suspend time buffer SUS_REG is a buffer for storing a suspend time and the power off time buffer OFF_REG is a buffer for storing a power off time.

The status flag OP_FLG is a flag representing the power management state and is set to mutually different values, each value corresponding to each power management state. In the following description, assume that the OP_FLG is set to 00H for the on state, to 01H for the stand-by state, to 10H for the suspend state and to 11H for the off state. All the values, 00H, 01H, 10H and 11H are represented in by a hexadecimal value, but the values may be determined differently according to use.

The count buffer CNT_REG is a buffer for counting a time lapse, and a time value of the count buffer CNT_REG is counted each time a timer interrupt signal, generated periodically from the timer 2, is generated. Assume, in the following description, that a period of the timer interrupt signal generated from the timer 2 is 50 ms, that a time value of the count buffer CNT_REG is reduced by one each time the timer interrupt signal is generated. Then a count unit of the count buffer CNT_REG becomes one unit for 50 ms. When the user determines the stand-by time value, the suspend time value and the power off time value, he should determine the time value he wants according to the count unit of the count buffer CNT_REG. In a case, for instance, that each time value is one second, the user inputs a time value of 20 into the count buffer CNT_REG, and in case of one minute the user inputs a time value of 1200 into the count buffer CNT_REG, and in case of one hour the user inputs a time value of 72000 into the count buffer CNT_REG. These are just examples and the timer interrupt and count values may be used differently according to the computer system and set up as one would desire.

The memory staying of the power management function causes the time monitoring procedure of FIG. 5 and the input device monitoring procedure of FIG. 6 to stay in the RAM of the memory 18, and at this time, alters the timer interrupt vector among interrupt vectors stored in the RAM of the memory 18, and a keyboard interrupt vector and a mouse interrupt vector related to the input device 8. Also the memory staying alters the time monitoring procedure so as to be performed every time the timer interrupt signal from the timer 2 is generated. That is, the existing timer interrupt vector is changed to a start address value of the time monitoring procedure and it calls that start address value for replacing the timer interrupt vector, in the present invention. Further, the memory staying alters the input device monitoring procedure so as to be performed every time there is input from the input device 8 and namely the existing keyboard interrupt vector and the existing mouse interrupt vector are changed to a start address value of the input device monitoring procedure, and in the present invention, replaces the keyboard interrupt vector and the mouse interrupt vector. Several kinds of control buffers, such as the count buffer CNT_REG, the stand-by time buffer STB_REG, the suspend time buffer SUS_REG the power off time buffer OFF_REG and the status flag OP_FLG, are stored in the RAM of the memory 18, see FIG. 7.

Art for staying a specific program in a memory or for releasing by removing the stayed program from the memory, are well known and the detailed description is therefore omitted. Such art is disclosed in detail, on pages 479–513 of chapter 19 as "write memory- resident software" in "Programmer's Guide, Version 6.0, for MS OS/2 and MS-DOS Operating System" published and distributed by Microsoft of the United States, and on pages 175–194 of chapter 7 from chapter 4 as "RAM staying program" in "The Interior of IBM PC" by collaboration of Dong Wahn, Shin and of Dong Jun, Shin, published and distributed in Ki Jeon Research Company on 20 Oct. 1992 in the Republic of Korea.

Figure 7:
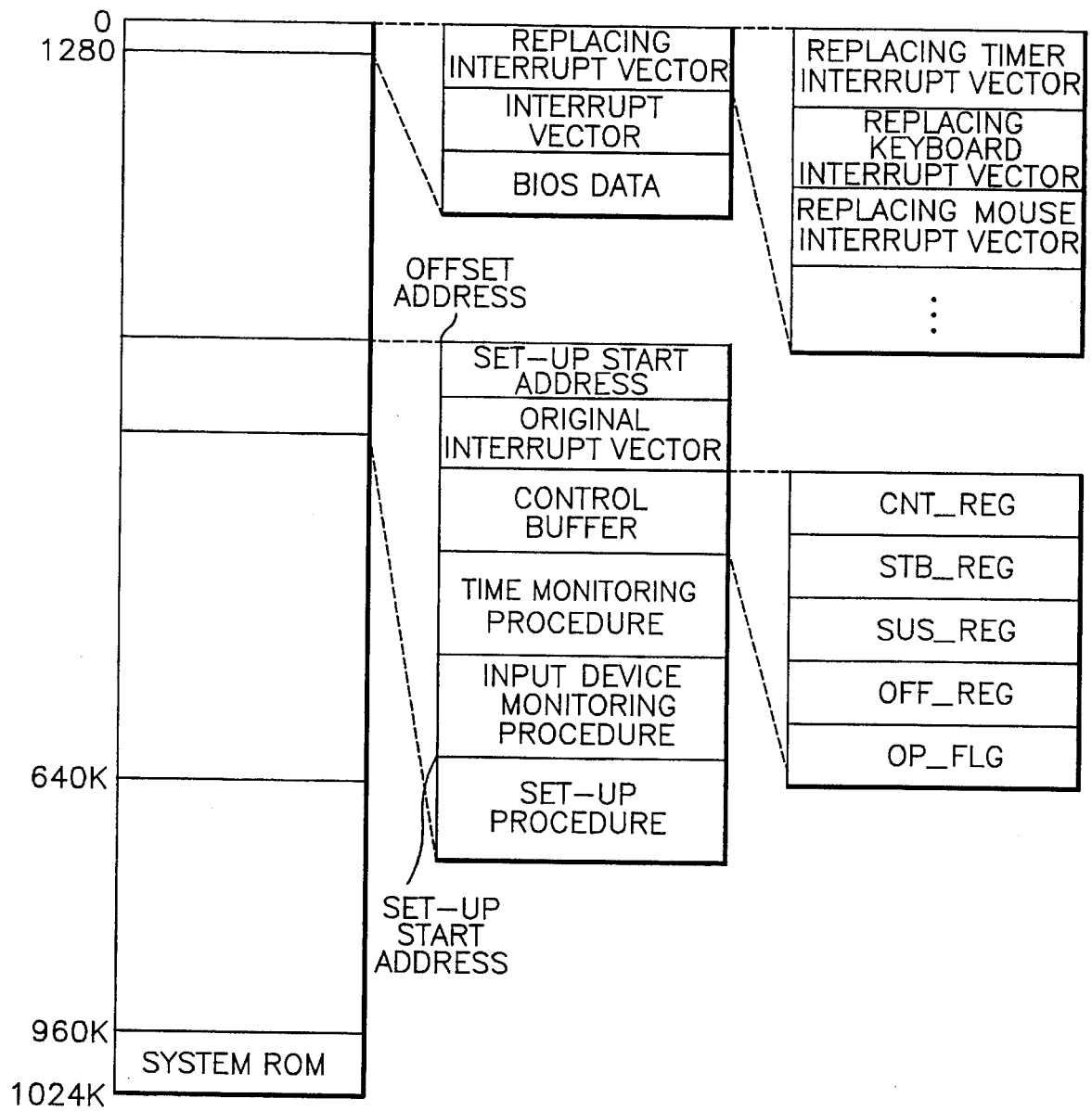
FIG. 7 is a memory map structure diagram of the present invention.

The memory map of FIG. 3 is changed as shown in FIG. 7 in accordance with the determination of the power management function of the present invention in the computer 100 by the operation described with regard to FIGS. 4A–4B.

Referring to FIGS. 4A–4B, description for processing operation of the set-up procedure according to the present invention is as follows. If the user selectively inputs each option with the power management performing key under the condition of storing procedures of FIG. 4A to FIG. 6 on floppy disk or hard disk of the auxiliary memory apparatus 10, the CPU 4 checks for existence of an option in step 402, in response to input of the power management performing key in step 401 of FIG. 4A.

If there is no option in step 402, the stand-by time buffer STB_REG, the suspend time buffer SUS_REG, and the power off time buffer OFF_REG are set according to predetermined default values in step 403. The CPU 4 represents, the power management state as the on state, by setting the status flag OP_FLG to 00H in step 404. Then, the CPU 4 sets the count buffer CNT_REG to a storage value of the stand-by time buffer STB_REG in step 405. Accordingly, if the user does not use the computer system for a period of time value of the stand-by time buffer STB_REG, a power saving mode may be performed from the stand-by state sequentially. Then the CPU 4 executes the memory staying for the power management function in step 406 as aforementioned, then returns to step 401.

If there is an option in the step 402, step 407 checks whether or not the option determined to exist in step 402 is the staying releasing option. If it is the staying releasing option in the step 407, step 408 releases the memory staying for the power management function, and in step 409 outputs, to the monitor 16, a staying releasing message which informs the user that the power management function has been removed from the memory 18, then returns to step 401.

If there is no staying releasing option in the step 407, step 410 checks for the existence of the stand-by time option and if there is no the stand-by time option, step 411 sets the stand-by time buffer STB_REG to the predetermined default value. If there is a stand-by time option, step 412 sets the stand-by time buffer STB_REG to a selected time value input by the user.

Step 413 checks for the existence of the suspend time option and if there is no suspend time option, step 414 sets the suspend time buffer SUS_REG to a predetermined default value. If there is a suspend time option, step 415 sets the suspend time buffer SUS_REG to a selected time value input by the user. Step 416 checks for the existence of the power off time option and if there is no the power off time option, step 417 sets the power off time buffer OFF-REG to a predetermined default value. If there is a power off time option, step 418 sets the power off time buffer $SUS_{13}REG$ to a selected time value input by the user.

After that, the CPU 4 indicates that the power management state is the on state, by setting the status flag OP_FLG as 00H in step 419. In step 420, the CPU 4 sets the count buffer CNT_REG as a time value of the stand-by time buffer STB_REG. If the user does not use the computer system for a period of time value of the stand-by time buffer STB_REG, the power saving mode may be performed from the stand-by state, sequentially, as discussed below.

Step 421, checks the existence of implementation of the power management function, namely, checks whether or not the power management function as the time monitoring procedure and the input device monitoring procedure of the present invention are stayed, resident, in the memory 18. A method for confirming the memory staying is described in details, at chapter 19 "write memory-resident software" (at pages 479 to 513) of "Programmer's Guide, Version 6.0, for MS OS/2 and MS-DOS Operating System", afore-mentioned, or at chapters 4 to 7 "RAM staying program" (at pages 175 to 194) of "the interior of IBM PC", above-mentioned. Therefore, the detailed description is omitted. If the power management function is not resident in the memory 18, step 422 executes the memory staying for the power management function by judging a non-implementation of the power management function. If the power management function is resident in the memory 18, as shown in FIG. 7, step 423 is performed by deciding that the power management function is being implemented. Step 423 changes the control buffer values, such as the stand-by time buffer STB_REG, the suspend time buffer SUS_REG, the power off time buffer OFF_REG, the status flag OP_FLG and the count buffer CNT_REG, to values determined in the steps from 410 to 420, and then returns to step 401.

Therefore, as discussed below, the power management signal is generated for controlling the power supply and the operating state of the monitor 16 corresponding to use state of the input device 8, by determining the power management function in accordance with implementation of the set-up procedure. Further, the user may set the control time value to a value determined by the user or let the CPU set the control time value to a predetermined default value. At this time, the aforementioned set-up procedure of FIGS. 4A and 4B, itself is not stayed or resident in memory 18. That is, only the time monitoring and input device monitoring procedures of FIGS. 5 and 6 are resident in memory 18.

After installing the power management function, the CPU 4 executes the time monitoring procedure of FIG. 5 every time the timer interrupt signal is generated from the timer 2. Step 501 of FIG. 5 implements the original timer interrupt routine, and step 502 determines whether the power management state is the off state by checking whether or not the value of the status flag OP_FLG is equal to 11H, and returns to step 501 if the status flag OP_FLG is equal to 11H. Step 503 is executed if the status flag OP_FLG is not equal to 11H. Step 503 reduces the time value of the count buffer CNT_REG by one (1), and step 504 checks whether or not the time value of the count buffer CNT_REG now equals zero (0), and returns to step 501 if the count buffer CNT_REG is not 0.

Once the count buffer CNT_REG becomes zero CPU 4 checks to determine whether the power management state is one of the suspend state, the stand-by state, and the on state. Step 505 is performed for determining whether the power management state is the suspend state by checking whether or not the value of the status flag OP_FLG is 10H. If the status flag OP_FLG is not 10H, step 508 is performed. If the status flag OP_FLG is 10H, CPU 4 sets the status flag OP_FLG to 11H in order to change the power management state from the suspend state to the off state, controls cut-off of the horizontal synchronizing signal HS and the vertical synchronizing signal VS to monitor 16 in step 507, and then returns to step 501.

Step 508 determines whether the power management state is the stand-by state by checking whether or not the value of the status flag OP_FLG is 01H. If the status flag OP_FLG is not 01H, step 512 is performed. If the status flag OP_FLG is 01H, CPU 4 sets the status flag OP_FLG to 10H in step 509 in order to change the power management state from the stand-by state to the suspend state, permits the continued supply of the horizontal synchronizing signal HS to monitor 16 while controlling cut-off the vertical synchronizing signal VS to monitor 16 in step 510, sets the value of count buffer CNT_REG equal to the storage time value of the power off time buffer OFF_REG in step 511, and then returns to step 501.

Step 512 determines whether the power management state is the on state by checking whether or not the value of the status flag OP_FLG is 00H. If the status flag OP_FLG is not 00H, CPU 4 returns to step 501. If the status flag OP_FLG is 00H, step 513 stores the video data, step 514 sets the status flag OP-FLG to 01H, step 515 controls the cut-off of the horizontal synchronizing signal HS and permits the continued supply of the vertical synchronizing signal VS, step 516 sets the value in the count buffer CNT_REG equal to storage time value of the suspend time buffer SUS-REG, and the CPU 4 returns to step 501.

In order to selectively supply or cut off the horizontal synchronizing signal HS and the vertical synchronizing signal VS, as one embodiment of the present invention, the value of the CRT timing register of CRT controller 30 is changed and a more detailed description is as follows. In the CRT controller 30, the horizontal synchronizing signal HS is normally generated when the start horizontal retrace value is smaller than a value of the horizontal total value, and the vertical synchronizing signal VS is normally generated when the vertical retrace start value is smaller than the vertical total value. Accordingly, in order to cut off the horizontal synchronizing signal HS, the present invention stores the present start horizontal retrace value of the start horizontal retrace register in a given area of memory 18, and then registers a larger value than the horizontal total value of the horizontal total register in the start horizontal retrace register as the start horizontal retrace value. A state of the horizontal synchronizing signal HS maintains a constant level without appearance of pulse by reaching to the horizontal total value before reaching to the start horizontal retrace value when the horizontal counter value is continuously increased. Therefore, the horizontal synchronizing signal HS supplied to the monitor 16 is cut actually off. If desired to normally generate and supply the horizontal synchronizing signal HS to the monitor 16, CPU 4 register an already stored original start horizontal retrace value in the start horizontal retrace register. Similarly, for cutting off the vertical synchronizing signal VS, CPU 4 registers the vertical retrace start value as a larger value than the vertical total value and restores an original vertical retrace start value when necessary to again supply the vertical synchronizing signal VS. Therefore, the horizontal synchronizing signal HS and the vertical synchronizing signal VS are supplied or cut off only by control of the CPU 4, even without additional hardware or changing set-up of the hardware.

Referring again to FIG. 5 of the time monitoring procedure, the CPU 4 jumps to a start address of the time monitoring procedure indicated by replacing the timer interrupt vector as shown in FIG. 7 when the timer interrupt signal periodically generated from the timer 2 is applied thereto, and then performs the original timer interrupt routine in step 501.

And then, step 502 checks the value of the status flag OP_FLG and checks whether or not the present power management state is the off state, by determining whether the value of the status flag OP_FLG is 11H, no other implementation has occurred if the present power management state is the off state and since the power of the monitor 16 is cut off completely. If the value of the status flag OP_FLG is not 11H in the step 502, the present power management state may be any one state among the on state, stand-by state and suspend state.

The time value of the count buffer CNT_REG is reduced by one in step 503, for calculating non-use time of the computer system. The time value of the count buffer CNT_REG is assigned the time value of the stand-by time buffer STB_REG at the beginning of the procedure, and always has the time value of next power management state for the present power management state as mentioning later. For instance as shown in steps 508 and 509, in the case that the present power management state is the stand-by state, the time value of the count buffer CNT_REG is assigned the time value of the suspend time buffer SUS_REG.

In step 504 checks whether or not the time value of the count buffer CNT_REG becomes 0, and if the count buffer CNT_REG is not 0, returns to step 502 and the present power management state is continuously maintained by skipping step 501 in order to avoid restarting the interrupt routine in response to the timer interrupt signal output from timer 2.

In the step 504, if the time value of the count buffer CNT_REG is 0, step 505 checks the value of the status flag OP_FLG and checks whether or not the present power management state is the suspend state by determining whether the value of the status flag OP_FLG is 10H. If the status flag OP_FLG is 10H, the power management state is changed to the off state in steps 506 and 507. In step 506, the power management state represents the off state by assigning the status flag OP_FLG the value 11H, and in step 507 cuts off the generation of both the horizontal synchronizing signal HS and the vertical synchronizing signal VS by controlling the CRT controller 30. Accordingly, the off state is performed from this time in the monitor 16.

If the value of the status flag OP_FLG is not 10H in the step 505, step 508 checks the value of the status flag OP_FLG to determine whether the present power management state is the stand-by state. Steps to 509 to 511 are performed by judging the present power management state to be the stand-by state when the value of the status flag OP_FLG is determined to be 01H. Step 509 changes the power management state to the suspend state by assigning the status flag OP_FLG the value of 10H, step 510 determines only the horizontal synchronizing signal HS as supply state and the vertical synchronizing signal VS as cutting-off state by controlling the CRT controller 30. From this time, the monitor 16 is in the suspend state. Step 511 assigns the time value of the power off time buffer OFF_REG to the count buffer CNT_REG.

If the value of the status flag OP_FLG is not 01H in step 508, step 512 checks the value of the status flag OP_FLG to determine whether the present power management state is the on state. If the value of the status flag OP_FLG is not 00H the routine returns to step 501 and waits for the next interrupt signal from timer 2. Judging the present power management state to be the on state by determining the status flag OP_FLG to have the value 00H, the power management state is changed to the stand-by state by executing steps 513 to 516. At this time, the video data for a screen being displayed on monitor 16 through the display controller 14, is stored in a given area of the memory 18 in step 513, since the present power management state is to be changed to the stand-by state from the on state, the stand-by state being start state of the power saving mode. By storing the video data as above, the original screen may be re-displayed when the present power management state becomes the on state again. Step 514 changes the power management state to the stand-by state by assigning the status flag OP_FLG the value 01H, and step 515 determines the horizontal synchronizing signal HS as cutting-off state and only the vertical synchronizing signal VS as supply state by controlling the CRT controller 30, and monitor 16 obtains the stand-by state at this time. Then step 516 assigned the time value of the suspend time buffer $SUS_{13}REG$ to the count buffer CNT_REG.

Whenever the routine returns to step 501 the value of the count buffer CNT_REG is reduced in step 503 when the timer interrupt signal from the timer 2 is generated provided the power management state is not the off state. The routine then loops through steps 502 to 504 until the value in the count buffer CNT_REG becomes 0. Once the count buffer CNT_REG becomes 0 the present power management state is checked to determine if it is in the suspend state, stand-by state or the on state. Accordingly, based on the determination made regarding the present power management state, if the power management state is the on state it will be changed from the on state to a stand-by state then to a suspend state and finally to an off state. If the present power management state is in the stand-by state it will be changed to the suspend state and finally to the off state. And if the present power management state is in the suspend state then it will be changed to the off state. The time it takes to change from one power management state to another depends on the reception of a timer interrupt signal from timer 2 and on the value assigned to the count buffer CNT_REG, since the power management state cannot be changed until a timer interrupt signal is received and until the value of the count buffer CNT_REG is reduced to 0.

It is, in the above description, illustrated that the power management state is changed to a next power management state when the value of the count buffer CNT_REG becomes 0 by down counting from the time value of next power management state each time the timer interrupt signal is generated. It may be embodied with that the power management state is changed to the next power management when the value of the count buffer CNT_REG becomes the time value of the next power management state by counting up every time the interrupt signal is generated. If the relevant time value is determined as 0 in determining the count buffer CNT_REG as time value of next power management state, the power management state is changed to the next power management state by the very next timer interrupt signal generated. Therefore the relevant power management state is not actually performed if relevant a time value of any power management state is determined as 0.

Meanwhile, while controlling the power management function as described with regard to the timer interrupt routine, CPU 4 executes an input device monitoring procedure as illustrated in FIG. 6, wherein CPU 4 receives an input device interrupt each time there is an input from the input device 8. Step 601 of FIG. 6 checks whether or not the value of the status flag OP_FLG is 00H and step 605 is implemented if the status flag OP_FLG is 00H. If the status flag OP_FLG is not 00H, the video data is redisplayed in step 602, the status flag OP_FLG is set to 00H in step 603 and the horizontal synchronizing signal HS and the vertical synchronizing signal VS are supplied to monitor 16 in step 604. In step 605, the count buffer CNT_REG is assigned the time value of the stand-by time buffer STB_REG, and after implementation of the original input device interrupt routine in step 606 of checking for an input from input device 8, returns to step 601 when CPU 4 receives an input from input device 8.

Referring to FIG. 6, description for processing operation of the input device monitoring procedure is as follows. The CPU 4 jumps, by interrupt whenever there is an input from the input device 8, to a start address of the input device monitoring procedure indicated by the replacing of the keyboard interrupt vector and replacing of the mouse interrupt vector as shown in FIG. 7, and step 601 checks whether or not the present power management state is the on state by checking to determine whether the value of the status flag OP_FLG is 00H.

If the value of the status flag OP_FLG is not 00H in step 601, steps 602, 603 and 604 are performed and the power management state is changed to the on state. First, step 602 re-displays the video data stored during step 513 in changing from an on state to a stand-by state in steps 512 to 514 of FIG. 5, and assigns the value 00H to the status flag OP_FLG in step 603. By setting the status flag OP-FLG to 00H in step 603, the power management state becomes the on state, and since the power management state is now the on state, CPU 4 permits the supply of both the horizontal synchronizing signal HS and the vertical synchronizing signal VS to monitor 16 by controlling the CRT controller 30. Accordingly, the monitor 16 implements the on state from this time and the screen that was displayed upon entering the power saving mode is re-displayed.

The value of the stand-by buffer STB_REG is assigned as the value of the count buffer CNT_REG after step 604 is performed or after step 601 has determined the present power management state to be the on state by determining the status flag OP_FLG has the value 00H. Then step 606 jumps to the original input device interrupt routine to be originally implemented and then the routine returns to step 601 after processing the input from the input device 8.

If the input device 8 is used under the condition of the power saving mode as the power management state, in accordance with re-assigning the time value of the stand-by time buffer STB_REG to the count buffer CNT_REG regardless of the power management state of that time, the power saving anode using the timer interrupt routine of FIG. 5 may be performed sequentially from the stand-by state if the user does not use the computer system for a period of time according to the time value of the stand-by time buffer STB_REG. Consequently an implementation of the power saving mode is prevented while the user continuously uses the computer system, by re-assigning the time value of the stand-by time buffer STB_REG to the count buffer CNT_REG every time the input device 8 is used the power management state is in the on state.

CPU 4 performs the monitoring of the timer 2 and the input device 8 simultaneously, wherein should the power management state be any one of the stand-by state, the suspend state or the on state, but not the off state, once an input from input device 8 is detected the count buffer CNT_REG is assigned the time value of the stand-by buffer STB_REG and the state of the computer peripheral equipment, i.e. monitor 16 becomes the on state. Then the monitor 16 remains in the on state until elapse of the time interrupt period and count down of the count buffer CNT_REG to 0 from the assigned time value of the stand-by buffer STB_REG, if no input is detected from input device 8, at which time the power management state will change from the on state to the stand-by state by steps 512–514 of FIG. 5. If the power management state is determined to be the off state, it will remain in the off state until power is restored to the computer peripheral equipment by the user.

Accordingly, the non-use of the computer system is sensed by the absence of an input from the input device 8, and the power management signal for indicating the mutually different power management states is generated corresponding to the non-use time lapse sensed, without changing or additionally installing hardware in the interior or on the outside of the computer 100.

Figure 9:
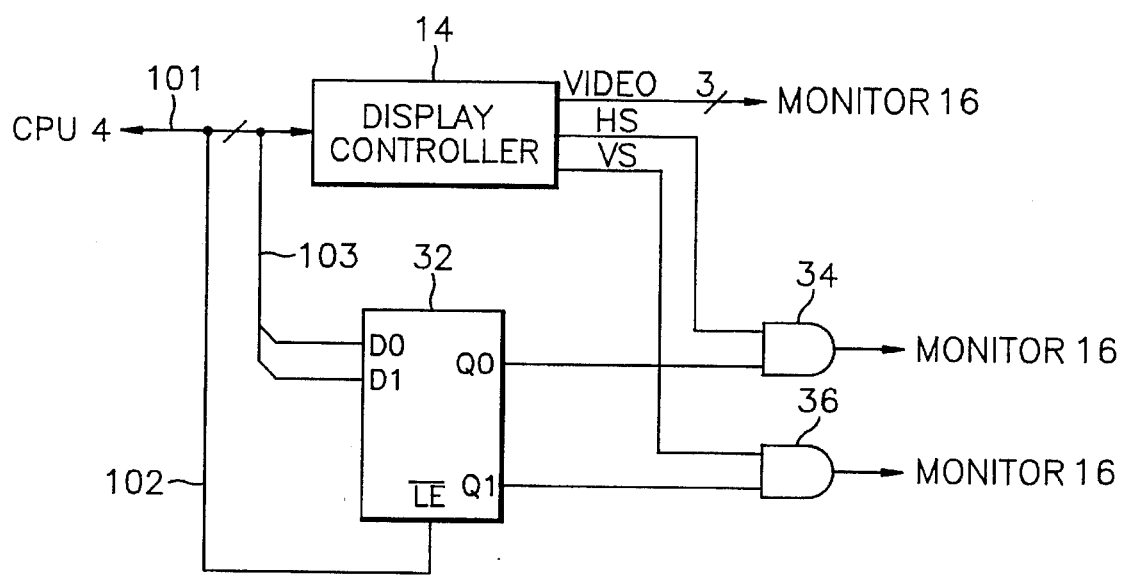
FIG. 9 is a control circuit diagram for generating a power management signal according to the present invention.

In the above description, the horizontal synchronizing signal HS and the vertical synchronizing signal VS are cut off or supplied by altering the value of the CRT timing register of the CRT controller 30. Cutting off or supplying the horizontal synchronizing signal HS and the vertical synchronizing signal VS may also be controlled by using of a power management signal control circuit as shown in FIG. 9. The display controller 14, as shown in FIG. 9, is the same as the display controller 14 of FIG. 1 and FIG. 2, and is connected to the CPU 4 through the system bus 101. A video signal VIDEO among outputs of the display controller 14 is supplied to the monitor 16 as it is as shown in FIG. 2, while the horizontal synchronizing signal HS and the vertical synchronizing signal VS are supplied to the monitor 16 through AND gates 34 and 36, respectively. A latch 32 is connected between system bus 101 and AND gates 34, 36. A latch enable terminal $\overline{LE}$ of the latch 32 is connected to an address bus 102 of the system bus 101 and input terminals D0 and D1 of the latch 32 are connected to a data bus 103 of the system bus 101. If an address signal applied to the latch enable terminal $\overline{LE}$ is a logic low "0", the latch 32 latches first and second power management data of 1 bit each applied separately to the input terminals D0 and D1 from the CPU 4. The latched first and second power management data separately appears on output terminals Q0 and Q1 of the latch 32. An output of AND gate 34 is the logic-product of the horizontal synchronizing signal HS output from display controller 14 and the first power management data output from the output terminal Q0 of latch 32, the output of AND gate 34 being supplied to monitor 16. If a signal output from the output terminal Q0 of the latch 32 is logic high "1", AND gate 34 is enabled and supplies the horizontal synchronizing signal HS output from the display controller 14 to the monitor 16 as it is. If the signal output from the output terminal Q0 of the latch 32 is the logic low "0", the AND gate 34 is disabled and cuts off or prevents supply of the horizontal synchronizing signal HS output from the display controller 14 to the monitor 16. An output of AND gate 36 is the logic-product of the vertical synchronizing signal VS output from the display controller 14 and the second power management data output from the output terminal Q1 of the latch 32, the output of AND gate 36 being supplied to monitor 16. That is, AND gate 36 is enabled and supplies the vertical synchronizing signal VS output from the display controller 14 to the monitor 16 if the signal output from the output terminal Q1 of the latch 32 is the logic high "1", and AND gate 36 is disabled and cuts off supply of the vertical synchronizing signal VS, output from the display controller 14, to the monitor 16 if the signal output from the output terminal Q1 of the latch 32 is the logic low "0".

Therefore, the CPU 4 assigns a specific address I/O not used in the computer 100 instead of changing of the CRT timing register value of the CRT controller 30, and uses the address I/O as a latch enable signal which enables a latch operation of the latch 32, and then may control the horizontal synchronizing signal HS and the vertical synchronizing signal VS so that the signals HS and VS are supplied to the monitor 16 or cut off by data recorded in the address I/O.

In case of using of the power management signal control circuit as the above, the CPU 4 controls the horizontal synchronizing signal HS and the vertical synchronizing signal VS output from the display controller 14 so that the signals HS and VS may be supplied to the monitor 16 or cut off as shown in steps 507, 510 and 515 of FIG. 5 and in step 604 of FIG. 6, by generating the first and second power management data instead of changing of the CRT timing register value of the CRT controller 30.

There is advantage in the present invention that the power management signal for controlling the power supply and the operation state of the computer peripheral equipment may be generated corresponding to the use state of the computer system, without changing of or adding additional hardware to the computer system. Furthermore, besides the user being able to set up or release the power management function in the computer, but also the user may voluntarily determine non-use time for each power management state.

While preferred embodiments of the present invention have been particularly shown and described, it will be understood by those skilled in the art that the foregoing other changes in form and details may be made without departing from the spirit and scope of the present invention as defined by the appended claims.

Particularly, as described above, although the power management function of the present invention is stayed or resident in the RAM of memory 18 according to the user's selection, it may also be installed in the ROM of memory 18. In this case, an implementation of additional set-up procedure by the user is not needed. Also while there was description for supplying of the power management signal just to the monitor as one of the computer peripheral equipment, the power management signal is applicable to all computer peripheral equipments having the power saving function.

It is therefore contemplated that the appended claims will cover any such modifications of embodiments as will fall within the true scope of the invention.

What is claimed is:

1. A method for generating power management signals for computer peripheral equipment in a computer system which includes display control means for inputting a horizontal synchronizing signal and a vertical synchronizing signal from a computer as said power management signals and for executing any one power management state out of an on state, a stand-by state, a suspend state and an off state by input of said power management signals, corresponding to non-use time lapse of the computer system, said method comprising the steps of:

checking a present power management state, by checking a value of a status flag, whenever a timer interrupt signal is generated;

maintaining the present power management state as it is when the present power management state is determined to be the off state;

changing a count time value to determine a time lapse of a predetermined unit of time when the present power management state is determined not to be the off state;

checking whether the changed count time value is equal to a preset value;

checking the present power management state when the first said checking step determines that said present power management state is not the off state and said count time value is not equal said preset value;

changing said status flag value to a value of said off state when the present power management state is determined to be the suspend state, changing timing values of said display control means for cutting off supply of said horizontal synchronizing signal and said vertical synchronizing signal to said computer peripheral equipment;

changing said status flag value to a value of said suspend state when the present power management state is determined to be the stand-by state, changing a time value of said display control means for cutting off the supply of said vertical synchronizing signal to said computer peripheral equipment and simultaneously supplying only said horizontal synchronizing signal to said computer peripheral equipment, and converting said count time value a predetermined off time value;

changing said status flag value to a value of said stand-by state when the present power management state is determined to be the on state, controlling a time value of said display control means for cutting off the supply of said horizontal synchronizing signal to said computer peripheral equipment and simultaneously supplying only said vertical synchronizing signal to said computer peripheral equipment, and converting said count time value to a predetermined suspend time value; and changing the status flag value to a value of the on state whenever there is a signal input from an input device, and converting said count time value to said stand-by time value;

said step of changing said status flag value to a value of said off state further comprises the steps of cutting-off the supply of said horizontal synchronizing signal by detecting when a time value of a start horizontal retrace register of said display control means is larger than a time value of a horizontal total register, and cutting off the supply of said vertical synchronizing signal by detecting when a time value of a vertical retrace start register of said display control means is larger than a time value of a vertical total register.

2. The method as claimed in claim 1, wherein said step of changing said status flag value to a value of said stand-by state further comprises the step of storing video data being displayed in a given storage area.

3. The method as claimed in claim 2, wherein said step of changing said status flag value to a value of said stand-by state further comprises the step of checking the present power management state, by checking the value of said status flag, after performing an original timer interrupt routine whenever the timer interrupt signal is generated.

4. The method as claimed in claim 3, wherein said step of changing said status flag value to a value of said on state comprises the steps of:

checking the present power management state, by checking the value of said status flag, whenever there is a signal input from said input device;

changing said status flag value to the value of the on state when the present power management state is determined not to be the on state, and converting said count time value to said stand-by time value, as a first on state executing step when said signal is input from said input device; and maintaining said count time value as said stand-by time value when the present power management state is the on state, as a second on state executing step when said signal is input from said input device.

5. The method as claimed in claim 4, wherein said first on state executing step comprises the steps of:

re-displaying the video data stored previously in said video storing step;

changing said status flag value to said value of the on state;

restoring the time values of the start horizontal retrace register and of the vertical retrace start register of said display control means to predetermined original values, and supplying normally said horizontal synchronizing signal and said vertical synchronizing signal; and converting said count time value to said stand-by time value.

6. The method as claimed in claim 4, wherein said first and second on state executing steps further comprise the step of performing an original input device interrupt routine of checking for another input signal from said input device after converting said count time value to said stand-by time value.

7. A method for generating power management signals for computer peripheral equipment in a computer system which includes computer peripheral equipment for receiving a horizontal synchronizing signal and a vertical synchronizing signal supplied from a computer as the power management signals and for executing any one power management state out of an on state, a stand-by state, a suspend state and an off state, corresponding to non-use time lapse of the computer system, said method comprising the steps of:

checking a present power management state whenever a timer interrupt signal is generated;

maintaining the present power management state as it is when the present power management state is determined to be the off state;

changing a count time value indicating a time lapse of a predetermined unit of time when the present power management state is determined not to be the off state;

checking whether the count time value is changed to a preset value after step of changing a count time value;

checking the present power management state when said count time value is not changed to said preset value;

setting the present power management state to the off state when the present power management state is determined to be the suspend state, and cutting off supply of said horizontal synchronizing signal and said vertical synchronizing signal to said computer peripheral equipment;

changing the present power management state to the suspend state when the present power management state is determined to be the stand-by state, cutting off the supply of said vertical synchronizing signal to said computer peripheral equipment and simultaneously supplying only said horizontal synchronizing signal to said computer peripheral equipment, and converting said count time value to a predetermined power off time value;

changing the present power management state to the stand-by state when the present power management state is determined to be the on state, cutting off the supply of said horizontal synchronizing signal to said computer peripheral equipment and simultaneously supplying only said vertical synchronizing signal to said computer peripheral equipment, and converting said count time value to a predetermined suspend time value;

changing the present power management state to the on state whenever there is an input signal from an input device, and converting said count time value to a predetermined stand-by time value;

checking for existence of an option in response to an input by a key which executes a power management function;

assigning respective predetermined default time values as said stand-by time value, said suspend time value and said power off time value when it is determined that no option exists, changing the power management state to the on state, converting said count time value to said stand-by time value, and staying said checking steps, said changing steps and said assigning steps in a memory, as a first memory staying step; and assigning respective time values corresponding to one or more existing options as respective ones of said stand-by time value, said suspend time value and said power off time value, assigning respective predetermined default time values as respective ones of said stand-by time value, said suspend time value and said power off time value which do not have an existing option, changing the power management state to the on state and converting said count time value to said stand-by time value, and staying said checking steps, said changing steps and said assigning steps in the memory, as a second memory staying step.

8. The method as claimed in claim 7, further comprising the step of releasing the memory staying of said checking steps, said changing steps and said assigning steps, when an option of memory staying releasing exists.

9. The method as claimed in claim 8, wherein said second memory staying step comprises the steps of checking whether a memory staying option exists for said checking steps, said changing steps and said assigning steps, and changing said time values when the memory staying option exists.

10. A method for generating a power management signal for computer peripheral equipment in a computer system for placing said computer peripheral equipment into a power management state, said power management state selectively being any one of an off state, an on state, a stand-by state and a suspend state, said method comprising the steps of:

detecting input from a power management performing key;

installing a time interrupt step and an input device monitoring step into a RAM of said computer system in response to a detected input from said power management performing key;

said installing step comprising the steps of:
assigning selected time values, respectively, to a stand-by buffer, a suspend buffer and an off buffer of said RAM;

assigning a first predetermined value to a status flag of said RAM, said status flag providing an indication of a present power management state;

assigning the time value of said stand-by buffer to a count buffer of said RAM;

detecting a time interrupt signal output from a timer of said computer system, and performing said time interrupt step in response to said time interrupt signal being detected, said time interrupt step controlling generation of said power management signal; and monitoring an input device to detect an input from said input device, said input device monitoring step being performed in response to detection of said input from said input device.

11. The method as set forth in claim 10, said time interrupt step comprising the steps of:

determining whether said present power management state is said off state by checking whether a value of said status flag is a second predetermined value;

reducing the time value assigned to said count buffer by one when said value of said status flag is determined not to be said second predetermined value;

determining whether said time value of said count buffer is equal to zero;

determining whether said present power management state is said suspend state by checking whether said value of said status flag is a third predetermined value when said time value of said count buffer is determined to be zero;

changing the power management state from said suspend state to said off state by assigning said second predetermined value to said status flag when said status flag is determined to be said third predetermined value;

generating said power management signal for cutting off a horizontal synchronizing signal and a vertical synchronizing signal provided to said computer peripheral equipment when said power management state is said off state; and returning to said step of detecting said time interrupt signal output from said timer of said computer system when said status flag is determined to be said second predetermined value in said step of determining whether said present power management state is said off state by checking whether a value of said status flag is a second predetermined value, when said time value of said count buffer is determined not to be equal to zero in said step of determining whether said time value of said count buffer is equal to zero, or when said horizontal synchronizing signal and a vertical synchronizing signal are cut off.

12. The method as set forth in claim 11, said time interrupt step further comprising the steps of:

determining whether said present power management state is said stand-by state by checking whether said value of said status flag is a fourth predetermined value when said step of determining whether said present power management state is said suspend state by checking whether said value of said status flag is a third predetermined value determines said status flag in not said third predetermined value;

changing the power management state from said stand-by state to said suspend state by assigning said third predetermined value to said status flag when said step of determining whether said present power management state is said stand-by state by checking whether said value of said status flag is a fourth predetermined value determines said status flag is said fourth predetermined value;

generating said power management signal for cutting off said vertical synchronizing signal provided to said computer peripheral equipment and for supplying said horizontal synchronizing signal to said computer peripheral equipment; and then assigning the time value of said off buffer to said count buffer and returning to said step of detecting said time interrupt signal output from said timer of said computer system.

13. The method as set forth in claim 12, said time interrupt step further comprising the steps of:

determining whether said present power management state is said on state by checking whether said value of said status flag is said first predetermined value when said step of determining whether said present power management state is said stand-by state by checking whether said value of said status flag is said fourth predetermined value determines said status flag in not said fourth predetermined value;

storing video data presently being displayed by said computer peripheral equipment when said step of determining whether said present power management state is said on state by checking whether said value of said status flag is said first predetermined value determines said value of said status flag is said first predetermined value;

changing the power management state from said on state to said stand-by state by assigning said fourth predetermined value to said status flag after performing said step of storing said video data; and generating said power management signal for cutting off said horizontal synchronizing signal provided to said computer peripheral equipment and for supplying said vertical synchronizing signal to said computer peripheral equipment, and then returning to said step of detecting said time interrupt signal output from said timer of said computer system.

14. The method as set forth in claim 12, said time interrupt step further comprising the steps of:

determining whether said present power management state is said on state by checking whether said value of said status flag is said first predetermined value when said step of determining whether said present power management state is said stand-by state by checking whether said value of said status flag is said fourth predetermined value determines said status flag in not said fourth predetermined value; and returning to said step of detecting said time interrupt signal output from said timer of said computer system when said step of determining whether said present power management state is said on state by checking whether said value of said status flag is said first predetermined value determines said value of said status flag is not said first predetermined value.

15. The method as set forth in claim 13, said input device monitoring step comprising the steps of:

determining whether said present power management state is said on state by checking whether said value of said status flag is said first predetermined value in response to a detected input from said input device;

re-displaying said video data stored in response to said step of storing video data presently being displayed;

assigning said first predetermined value to said status flag for changing said power management state to an on state;

generating said power management signal for supplying said horizontal and vertical synchronizing signals to said computer peripheral equipment, and then assigning the time value of said stand-by buffer to said count buffer; and performing said step of monitoring said input device.

16. The method as set forth in claim 15, further comprising performing said step of assigning the time value of said stand-by buffer to said count buffer when said step of determining whether said present power management state is said on state by checking whether said value of said status flag is said first predetermined value in response to a detected input from said input device determines said value of said status flag is said first predetermined value.

* * * * *